United States Patent [19]

Forand, Jr.

[11] 3,912,152
[45] Oct. 14, 1975

[54] METHOD FOR CLADDING A FERROUS SUBSTRATE WITH NON-FERROUS METALS

[75] Inventor: James L. Forand, Jr., Kunkletown, Pa.

[73] Assignee: Bethlehem Steel Corporation, Bethlehem, Pa.

[22] Filed: Mar. 4, 1974

[21] Appl. No.: 447,713

Related U.S. Application Data

[60] Division of Ser. No. 218,802, Jan. 18, 1972, Pat. No. 3,832,147, and a continuation-in-part of Ser. No. 867,014, Oct. 16, 1969, abandoned.

[52] U.S. Cl. ............... 228/190; 228/193; 228/219; 228/235; 228/243; 228/263
[51] Int. Cl.² ........................................ B23L 31/02
[58] Field of Search............ 29/472.3, 497.5, 196.2, 29/196.3, 498, 494

[56] References Cited
UNITED STATES PATENTS 2,860,409  11/1958  Boessenkool et al. ......... 29/497.5 X
2,965,963  12/1960  Batz et al. ...................... 29/497.5 X Primary Examiner—Ronald J. Shore
Attorney, Agent, or Firm—Joseph J. O'Keefe; Charles A. Wilkinson; John S. Simitz

[57] ABSTRACT

A method for producing a composite article having a ferrous substrate and at least one non-ferrous metal, for example, copper or aluminum, clad thereto on one surface or on both surfaces. The method includes cold rolling the substrate and cladding to effect a reduction of about 5%, heating the composite thus formed to a temperature in the range of a minimum of 600° F. and a maximum which is about 100° F. below the temperature at which the clad metal will melt, and rolling the composite within this temperature range to effect a reduction of about 20 to about 50%. The composite may be further reduced to obtain final gage. The product produced by cladding copper and aluminum on the surfaces of a ferrous substrate is also described and claimed.

9 Claims, 2 Drawing Figures 3,912,152

METHOD FOR CLADDING A FERROUS SUBSTRATE WITH NON-FERROUS METALS

CROSS-REFERENCES TO RELATED APPLICATION

This is a division, of application Ser. No. 218,802, filed Jan. 18, 1972, now U.S. Pat. No. 3,832,147.

This is a continuation-in-part of my application Ser. No. 867,014, filed Oct. 16, 1969 for "A Method for Cladding a Ferrous Substrate with Non-Ferrous Metals and Product Produced Thereby."

BACKGROUND OF THE INVENTION

It is commercially desirable to produce a composite article having a ferrous substrate clad with a soft metal, for example, a non-ferrous metal, such as copper and/or aluminum. A composite thus formed combines the characteristics of the metals therein. However, in forming such a composite the soft non-ferrous metals which are used for cladding can initially be reduced more easily than the ferrous substrate. As a result, these softer metals spread when subjected to drastic reductions and extend beyond the boundaries of the substrate. It is, therefore, necessary to reduce the composite with care to prevent undue spreading of the soft metals. The soft non-ferrous metals may work harden more rapidly than the substrate, necessitating frequent heat treatments between rollings to soften the claddings sufficiently to be rolled to a desired thickness without cracking. The contiguous surfaces of the metals to be joined must be in such a condition that they may easily bond together metallurgically. A mechanical bond is not sufficiently strong to prevent delamination in the composite if it is used in deep-drawing applications. Therefore, it is essential to obtain a strong metallurgical bond in the composite by heat treatment. However, heat treating the composite to obtain the desired metallurgical diffusion bond may result in the formation of brittle intermetallic compounds in the interface between the metals, resulting in early failure of the composite.

Prior art practices to overcome the above difficulties are directed to combinations of cold cladding, heating to a high diffusion temperature to obtain a metallurgical bond, after which the composite is processed in a series of reductions and anneals to the finished gage; heating the substrate prior to rolling; heating the cladding metal prior to rolling; or heating the rolls prior to rolling; rolling at a prescribed speed during cladding while feeding the cladding and substrate at specific angles into the roll passes. All these processes are expensive, complicated and time consuming with no assurance the composite thus formed will be a usable product.

It is an object of the invention to provide a method in which a hard ferrous substrate may be clad with a soft nonferrous metal such as copper and/or aluminum which employs a simple relatively inexpensive cold rolling-hot rolling sequence and by which a metallurgical diffusion bond is formed between the substrate and the cladding.

It is a further object of this invention to provide a method in which a ferrous substrate may be clad simultaneously with two dissimilar non-ferrous metals and by which a metallurgical bond is formed between the substrate and the cladding.

It is a still further object of this invention to provide a composite product which consists of a ferrous substrate with two dissimilar non-ferrous metals metallurgically bonded thereto.

SUMMARY OF THE INVENTION

Broadly the invention is directed to a method for cladding soft metals to a ferrous substrate including cold rolling the composite to obtain a mechanically-bonded composite, heating the composite to a temperature suitable for promoting metallurgical bonding, rolling the composite at this temperature to a desired reduction thereby forming a strong metallurgical bond between the metals in the composite. A product in which three dissimilar metals may be bonded together may be produced by the method.

PREFERRED EMBODIMENT OF THE INVENTION

Figure 1:
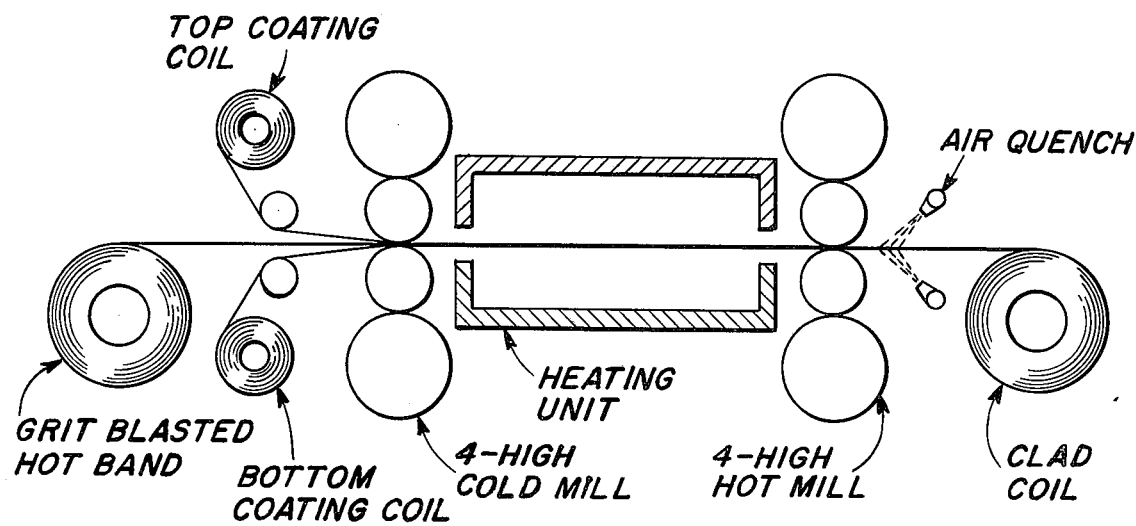
FIG. 1 shows the sequence of cladding a plurality of soft non-ferrous metals to a ferrous substrate.
Figure 2:
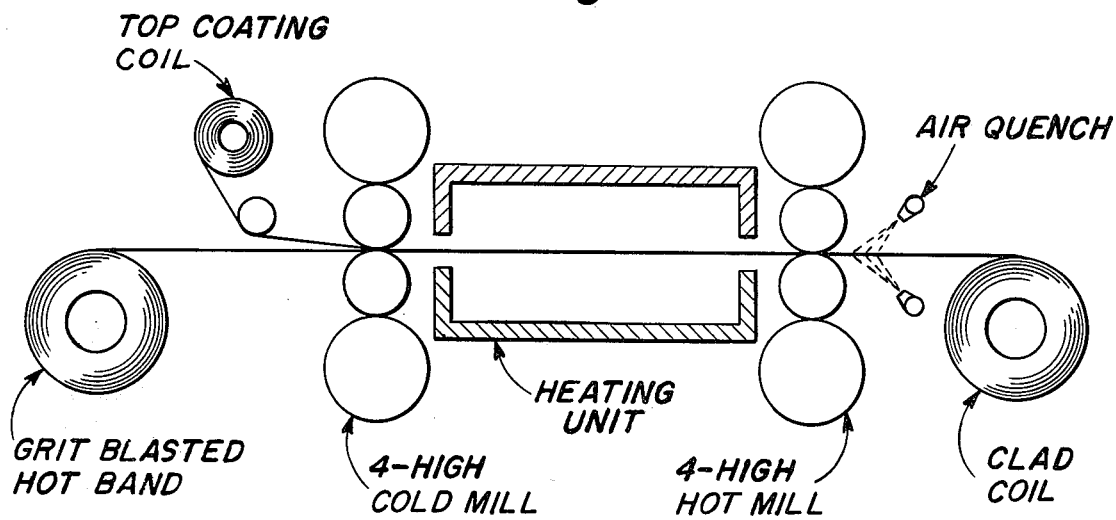
FIG. 2 is a modification of FIG. 1 in which cladding is applied to one surface of the substrate.

It has been found that soft non-ferrous metals may be clad to a ferrous substrate by a cold rolling-heating-hot rolling sequence as shown in FIGS. 1 and 2. The resultant composite will have a non-ferrous metal, for example, copper and/or aluminum, clad to a ferrous substrate either on both surfaces of the substrate or on one surface of the substrate.

The contiguous surfaces of the cladding metal or metals and the substrate must be clean and free of organic matter, oxides and other gross foreign matter. The surface of the substrate should be roughened as by grit blasting or sand blasting or wire brushing to provide a surface suitable for the desired mechanical bonding with the cladding material.

The composite is cold reduced sufficiently in a conventional cold rolling mill to form a mechanical bond strong enough to hold the composite together. I have found that a reduction of 5% or more will produce the desired mechanical bond. The cladding is mechanically "locked" to the substrate thereby excluding the admission of the oxygen of the environmental atmosphere during subsequent heating.

The composite is then heated in a furnace which may be a high frequency induction heating unit to a desired temperature within the range of a minimum of 600° F. and a maximum which is about 100° F. below the temperature at which the cladding will melt. A composite consisting of copper cladding-ferrous substrate may be heated to within a temperature range of about 600° F. to about 1880° F. since copper melts at about 1980° F. A composite of aluminum cladding-ferrous substrate may be heated to within a temperature range of about 600° F. to about 1120° F. which is about 100° below the temperature at which aluminum will melt, which is 1220° F. Of course a copper-aluminum cladding-ferrous substrate composition may be heated to within a temperature range of about 600° F. to about 1120° F. since the melting temperature of aluminum is controlling. The atmosphere in the furnace may be slightly oxidizing, reducing, or neutral, but it is preferred to use a reducing atmosphere, for example NH gas. A reducing environment, for example NH gas, is preferred. The composite is heated for a time sufficient to obtain a substantially uniform temperature through the thickness thereof. The composite is rolled while at a temperature within this range in a conventional rolling mill to obtain a reduction of at least about 20% in the cross-sectional area of the composite. The combination of heating and rolling the cladding and substrate at the desired temperature produces a metallurgical diffusion bond between the cladding and the substrate. Brittle intermetallic compounds are not formed during the heating and hot rolling of the composites of the invention, which compounds might interfere with the formation of the metallurgical bond to thereby prevent bonding of the cladding and substrate. Of course, the composite may be "skin" passed or reduced to a final desired size by cold rolling after which it may be annealed at a desired temperature, for example 1200° F. for copper clad steel, in a protective environment, for example NH gas or dry hydrogen gas, to relieve stresses induced during the cold rolling.

It has been found that steel having thicknesses within the range of about 0.050 of an inch to about 0.125 of an inch can be clad with copper and/or aluminum having thicknesses within the range of 0.001 of an inch and 0.010 of an inch. It is extremely difficult if not impossible to clad the above thicknesses of steel with copper and/or aluminum having thicknesses greater than disclosed above because the copper and/or aluminum "alligator" during the cold-rolling to develop the mechanical bond. "Alligatoring" is the separation of the clad metal from the ferrous substrate after the composite has passed through the cold-rolling mill.

Composites made by the described process did not show signs of flaking in the coating during the Olsen button test until a height of about 0.250 to 0.400 inches was attained. Microscopic examination of cross-sections of the composites showed a metallurgical bond had been achieved.

In a specific example of the invention a copper gliding metal, 0.005 inch in thickness and containing 95% copper and 5% zinc, and an aluminum alloy, 0.003 inch in thickness and containing 99% aluminum and 1% silicon, were clad on opposite surfaces of a ferrous substrate, 0.080 inch in thickness and containing carbon 0.04%, manganese 0.35%, sulfur 0.03%, phosphorus 0.01% and the remainder iron and incidental impurities. The non-ferrous metals were cleaned by pickling in a sodium dichromate-sulfuric acid solution and vapor degreased and the steel substrate was cleaned by pickling in a conventional acid bath, and the surface roughened by grit-blasting. The composite was cold reduced 10% in a cold-rolling Mesta Mill. The composite was heated in a furnace to a temperature of 750° F. for 5 minutes and while at that temperature was reduced 36% in a hot rolling operation. The composite was then cold reduced to 0.020 inch in thickness and annealed at 980° F. for 14 hours. Excellent coating adherence was obtained.

Several specimens were subjected to standard salt spray and humidity-corrosion tests. No corrosion was observed except at the cut or exposed edges. In Olsen button testing no flaking was observed at a height of 0.30 inch.

In another specific example, chemically cleaned aluminum foil, 0.003 inch in thickness, was clad on one surface of a pickled-grit blasted ferrous substrate, 0.090 inch in thickness. The composite was cold reduced on a cold rolling Mesta Mill to obtain a reduction of about 20%. The composite was heated to 700° F. in a protective environment of NH gas and was rolled at the aforementioned temperature in a 2-high Stanat Mill. The composite was reduced 30%. Good metallurgical bonding was obtained. No flaking was observed on the Olsen button testing until a height of 0.350 inch was reached. The composite was cold reduced to 0.036 inch gauge and annealed at 980° F. for 20 hours. There was no discernible flaking of the cladding in the Olsen button test until the height of 0.40 inch was exceeded.

In another example of the method of the invention, chemically cleaned copper strip, 0.005 inch in thickness was clad on one surface of a pickled-grit blasted ferrous substrate, 0.090 inch in thickness, by cold reducing the composite on a cold rolling Mesta Mill to obtain a reduction of 10%. The composite was heated to 750° F. in a furnace in a protective atmosphere of NH gas. The heated composite was hot rolled on a Stanat Mill to obtain a reduction of 47% in cross-section. The composite did not flake during Olsen button testing until a height of 0.350 inch was exceeded. The composite was cold reduced to 0.031 inch in thickness and box-annealed at 1200° F. for 24 hours in 100% dry hydrogen atmosphere. No flaking of the cladding metal was observed in Olsen button test samples run to a height in excess of 0.40 inch.

In this specification and claims wherever percentages are referred to such percentages are by weight unless otherwise noted. By copper I mean substantially pure copper and copper alloys. By aluminum I mean substantially pure aluminum and aluminum alloys.

I claim:

1. A method for producing a cold-rolled, heat-treated, hot-rolled three-layered metallic composite comprising a ferrous substrate having two surfaces and a cladding of at least one non-ferrous metal taken from the group consisting of copper and aluminum on each of said surfaces of said ferrous substrate, comprising:
   a. placing said cladding in contact with said surfaces of said ferrous substrate,
   b. cold rolling the composite to effect a reduction of between 5 and 20% in cross-sectional area of the composite and to obtain a mechanical bond between the non-ferrous metal cladding and the ferrous substrate,
   c. heating the composite in a protective atmosphere to a temperature in the range between a minimum of about 600° F. and a maximum temperature which is about 100° F. below the temperature corresponding to the lower temperature at which the non-ferrous cladding metal mechanically bonded to the surface of the ferrous substrate in step (b) will melt, and
   d. hot-rolling the composite to reduce the composite by at least 20% in cross-sectional area while within said temperature range to thereby produce a metallurgical diffusion bond between said non-terrous metal and said surfaces of said ferrous substrate.

2. The method of claim 1 in which one surface of the ferrous substrate is clad with copper and the other surface with aluminum.

3. The method of claim 1 in which the cladding in step (a) is aluminum and the composite of step (b) is heated to a temperature in the range of about 600° F. to about 1120° F. in step (c).

4. The method of claim 1 in which the cladding in step (a) is copper and the composite of step (b) is heated to a temperature in the range of about 1300° F. to about 1880° F. in step (c).

5. The method of claim 2 in which the composite of step (b) is heated to a temperature in the range of about 600° F. to about 1120° F. in step (c).

6. A method for producing a cold-rolled, heat-treated, hot-rolled two-layered composite comprising a ferrous substrate having two surfaces and a cladding of at least one non-ferrous metal taken from the group consisting of copper and aluminum on one surface of the ferrous substrate, comprising:
   a. placing the non-ferrous cladding in contact with one surface of the ferrous substrate,
   b. cold rolling the composite to effect a reduction of between 5% and 20% in cross-sectional area of the composite and to obtain a mechanical bond between the non-ferrous metal cladding and the ferrous substrate,
   c. heating the composite in a protective atmosphere to a temperature in the range between a minimum of about 600° F. and a maximum temperature of about 100° F. below the lower temperature at which the non-ferrous metal cladding mechanically bonded to the surface of the ferrous substrate in step (b) will melt, and
   d. hot-rolling the composite to reduce the composite by at least 20% in cross-sectional area while within said temperature range to produce a metallurgical diffusion bond between the non-ferrous metal cladding and said surface of the ferrous substrate.

7. The method of claim 6 in which the cladding placed on one surface of the ferrous substrate in step (a) is aluminum and the composite of step (b) is heated to a temperature in the range of about 600° F. to about 1120° F. in step (c).

8. The method of claim 6 in which the cladding placed on one surface of the ferrous substrate in step (a) is copper and the composite of step (b) is heated to a temperature in the range of about 1300° F. to about 1880° F. in step (c).

9. A method for producing a cold-rolled, heat-treated, hot-rolled, three-layered metallic composite comprising a ferrous substrate having two surfaces and a cladding of copper on one surface and a cladding of aluminum on the other surface of said ferrous substrate, comprising:
   a. placing said cladding in contact with surfaces of the ferrous substrate to form an unbonded composite,
   b. cold reducing the composite of step (a) to effect a mechanical bond between the cladding and the ferrous substrate sufficient to substantially exclude atmospheric oxygen from between the cladding and the ferrous substrate during subsequent heating, said reduction being on the order of 5 to 20% in cross-sectional area,
   c. heating said cold reduced composite in a protective atmosphere to a temperature of not more than 970° F., and
   d. hot-rolling the heated composite to effect a reduction of at least 20% in cross-sectional area of said composite at said heat-treating temperature to thereby produce a metallurgical diffusion bond between the cladding and the surfaces of the ferrous substrate.

* * * * *